US006814324B2

United States Patent
Gavit et al.

(10) Patent No.: US 6,814,324 B2
(45) Date of Patent: Nov. 9, 2004

(54) RELEASABLY LATCHABLE LEADER BLOCK IN TAPE THREADING APPARATUS FOR DATA STORAGE SYSTEMS AND METHOD THEREFOR

(75) Inventors: Stephan E. Gavit, Littleton, CO (US); Christopher D. Goldsmith, Littleton, CO (US)

(73) Assignee: Segway Systems, LLC, Littleton, CO (US)

( * ) Notice: Subject to any disclaimer, the term of this patent is extended or adjusted under 35 U.S.C. 154(b) by 0 days.

(21) Appl. No.: 10/189,811

(22) Filed: Jul. 3, 2002

(65) Prior Publication Data

US 2004/0004142 A1 Jan. 8, 2004

(51) Int. Cl.[7] .................................................. G11B 15/66
(52) U.S. Cl. ............................... 242/332.4; 242/332.8; 360/95
(58) Field of Search .......................... 242/332.4, 332.8; 360/95

(56) References Cited

U.S. PATENT DOCUMENTS

| 5,155,639 A | 10/1992 | Platter et al. |
| 5,303,875 A | 4/1994 | Hoge et al. |
| 5,374,003 A | * 12/1994 | Hoge et al. ............... 242/332.7 |
| 5,979,813 A | 11/1999 | Mansbridge et al. |
| 6,322,014 B1 | * 11/2001 | Nemeth ................... 242/332.4 |

* cited by examiner

Primary Examiner—John Q. Nguyen
(74) Attorney, Agent, or Firm—Timothy J. Martin; Michael R. Henson; Rebecca A. Gegick

(57) ABSTRACT

A leader block in a read/write recording apparatus includes a body member and a latch member that move relative to each other to receive, engage and retain the leader pin on a tape medium. The leader block may include finger-like engagement structures. The catch piece can be biased toward a closed position and can include a ramp to facilitate initial engagement of the leader pin. The catch piece can include an actuator tab. A threading assembly is disclosed to incorporate the leader block and includes an actuator that selective operates the catch piece via the actuator tab to permit disengagement of the leader pin therefrom. A cam assembly may control the actuator. This assembly is disclosed in conjunction with a threading assembly that includes a flexible conveyor member received in a guide track. A method utilizing this structure is described.

56 Claims, 6 Drawing Sheets

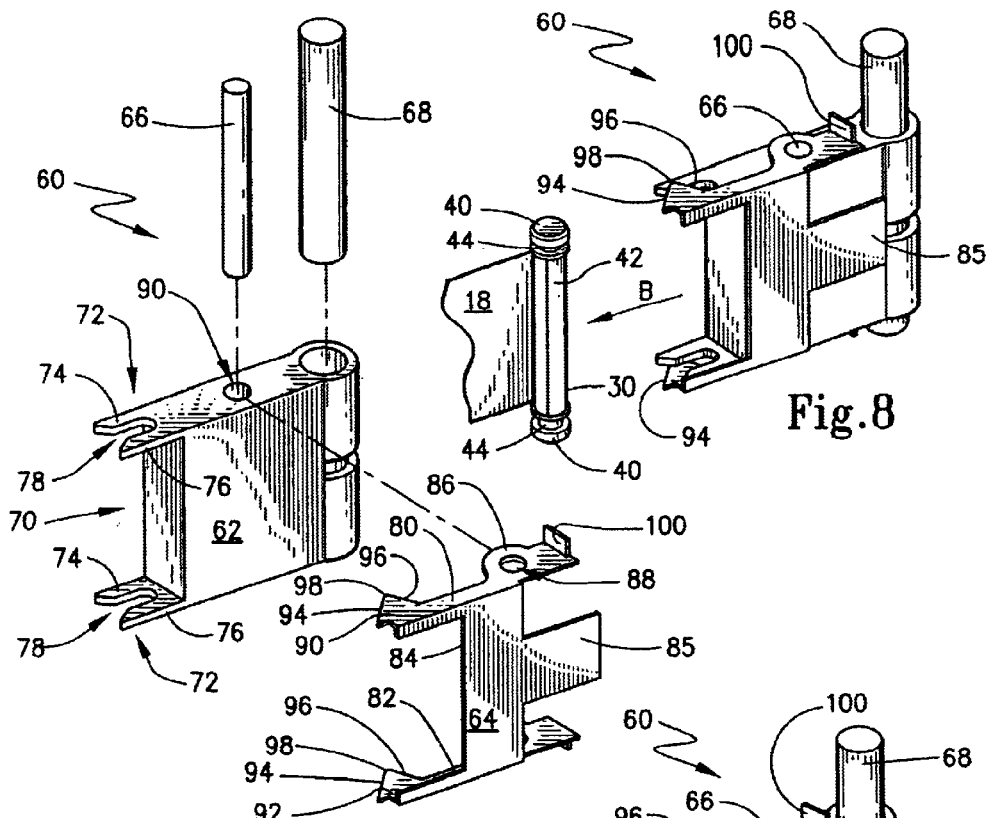
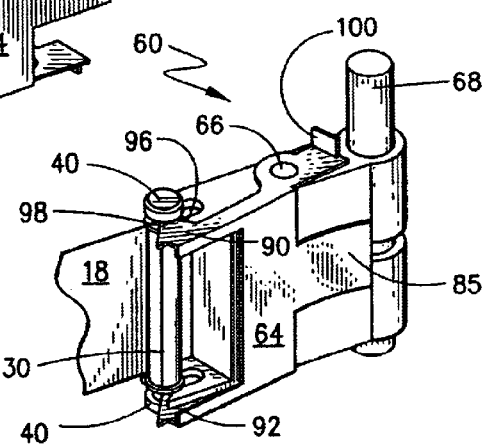
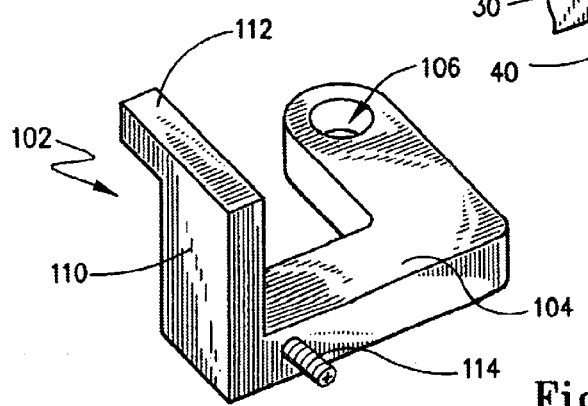
Fig. 7
Fig. 8
Fig. 9
Fig. 10

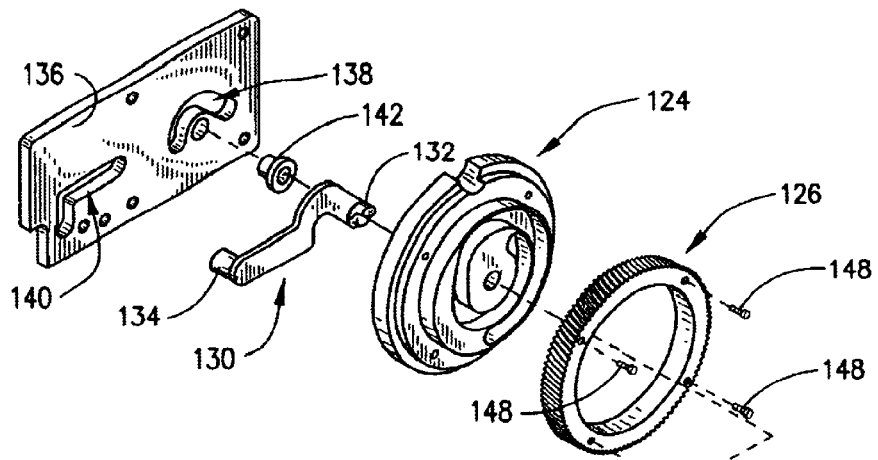
Fig.12
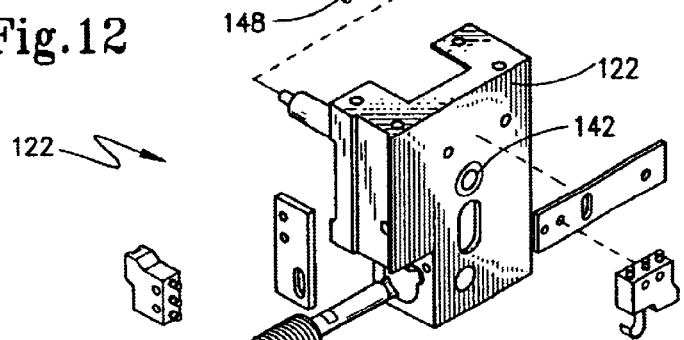
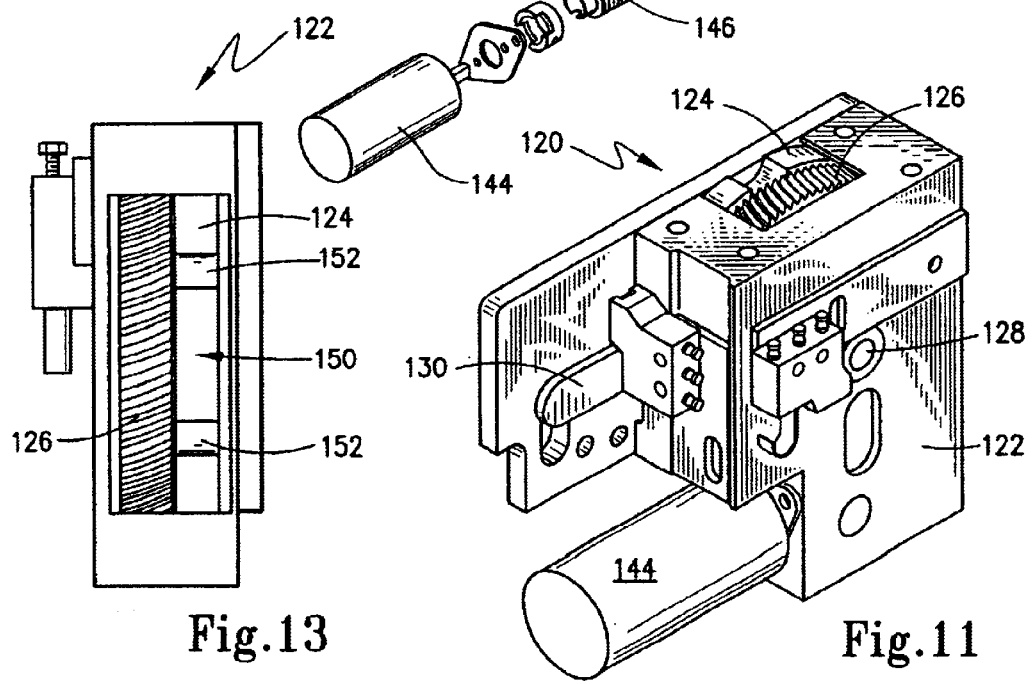
Fig.13
Fig.11

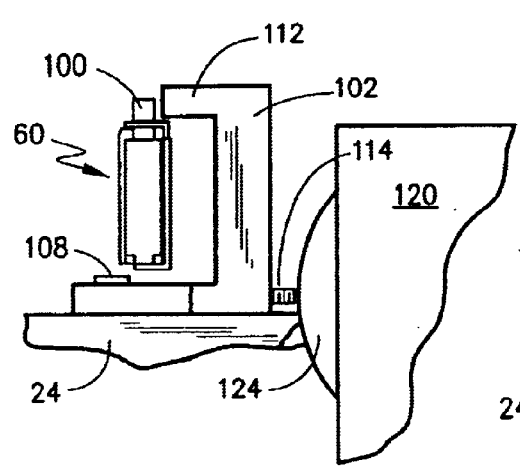
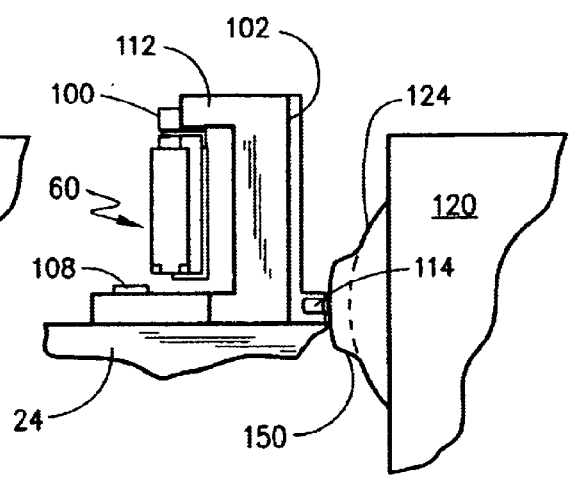
Fig.14a          Fig.15a
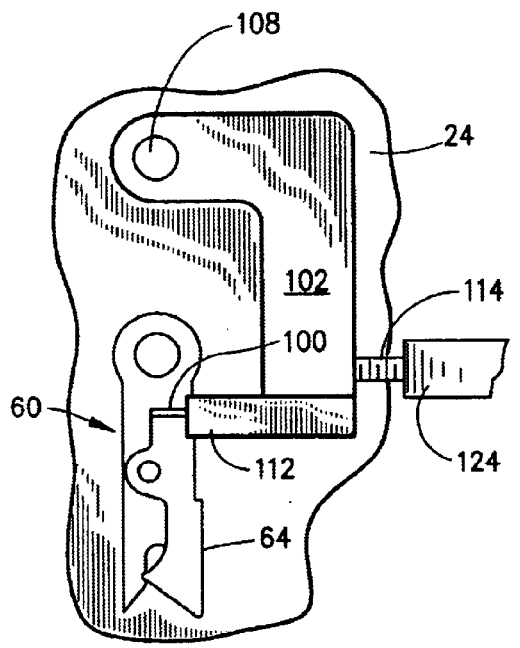
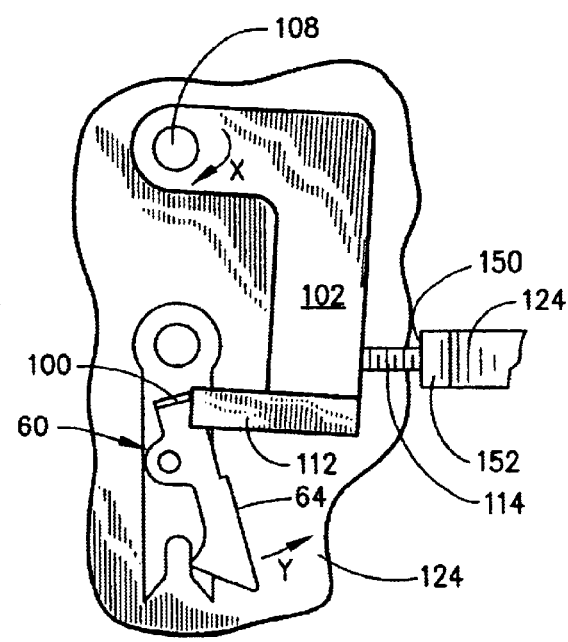
Fig.14b          Fig.15b

RELEASABLY LATCHABLE LEADER BLOCK IN TAPE THREADING APPARATUS FOR DATA STORAGE SYSTEMS AND METHOD THEREFOR

FIELD OF THE INVENTION

The present invention broadly concerns methods and apparatus for storing and retrieving data on a tape medium. More specifically, the present invention concerns tape threading apparatus on tape transport apparatus. The invention particularly concerns a leader block that positively locks onto a leader pin of a tape transport medium. The invention also concerns a method of threading the tape medium through the tape transport apparatus using such a leader block.

BACKGROUND OF THE INVENTION

The advent of the computer has already had a profound effect upon human society, and the impact of processing technology is expected to increase. Indeed, the desirability to store information for subsequent retrieval currently grows at an exponential rate. Thus, various types of devices have been developed to store data both for on-line usage as well as for archival purposes.

Where on-line processing requires data to be readily at hand, a significant improvement was provided by the advent of the magnetic disk storage array. Here, one or more magnetic disks are provided, and a read/write recording head is used to record information on the disk as well as to retrieve information or data for use by the computer processor. Significant strides have been made in the ability to increase the density of data stored on such magnetic disk arrays. In order to gain an even higher density for on-line data, the optical disk was developed. These devices record data based upon a very small wavelength of light so that a higher density is obtained due to this technique. Laser light is employed to read the stored information or data on the optical disk.

In early days of the computer, before the advent of the magnetic disks and the optical disk storage assemblies, data was typically stored on magnetic tapes, such as reel-to-reel tapes and later cassettes. In a magnetic tape storage device, a magnetic coil is used as a transducer to imprint data magnetically on a moving band of magnetic film; thereafter, when the film is advanced across the transducer, the data may be read and re-input into a co-processor. Magnetic tape can be erased and rewritten many times and has an advantage of low cost.

Magnetic tape is still a highly desirable format for archiving data for rapid access is of less significance and cost is of concern. However, where vast quantities of data are to be maintained, these tapes can be bulky due to the physical number necessary to store the quantity of data. The capacity for such tapes to store data, of course, is dependent upon the number of "tracks" which can be independently placed across the width of the tape.

The ability to write data rapidly onto a magnetic tape film and the accessibility of data to be read from the film is a function of two variables: (1) the density of storage; and (2) the speed at which the tape medium may be transported across and accurately written/read by the transducer. Thus, for example, a magnetic tape read/write system that is able to read and write nine tracks of data on a single strip of tape will hold four and one-half times the amount of data as a system which only utilizes two tracks. Therefore, efforts to increase the capacity of magnetic tapes to store data have included substantial efforts to increase the number of tracks which can be written on a band of magnetic tape.

In the above-described systems, storage reels of tape, whether flanged or flange-less (for example as used in cartridges) may be placed on the machine during use. A threading assembly engages the free end of the tape and passes it through the machine. Typically, the tape is threaded across air bearings, past the transducer and into a take-up hub or reel. The length of the tape is then passed through the machine so that information may be placed on the tape or retrieved therefrom. During this process, the length of tape is transferred onto a take-up reel or hub that is either a part of the machine itself, included within the cartridge or that is mounted and de-mounted from such machine. After being transported through the machine, the tape may be rewound onto the storage reel and removed from the machine.

As was explained in my earlier U.S. Pat. No. 5,777,823, issued Jul. 7, 1998, it is important that the lateral edge of the tape moving in a transport direction be properly registered along a reference plane, called the datum, so that the data may be accurately input and retrieved from the tape medium. Support of the tape during transport is therefore critical, and typically employs guide rollers, air bearing and the like as is known in the art. Improved air bearings are the subject of U.S. Pat. No. 5,777,823 and U.S. patent application Ser. No. 10/111,728 filed Apr. 26, 2002 (priority date Oct. 28, 1999), the disclosures of which are hereby incorporated by reference. It is also important that the read/write head be accurately positionable. A representative structure for such positioning is shown in U.S. Pat. No. 6,078,478, the disclosure of which is hereby incorporated by reference.

Take-up reels are typically constructed to have a central hub that has annular flanges and a width slightly greater than the width of the tape. It is also known to use flange-less hubs in winding tape media. In either case, the hub is rotated about a central winding axis, and the length of tape is wrapped circumferentially around the hub.

Many tape drives utilize a tape source in the form of a cartridge which may be mounted or demounted into the recording and reading apparatus. These cartridges typically contain a spool of tape media upon which information may be stored. The tape media is then transported across the read/write recording head either to place data on a blank tape which you override existing data, as is the case with a "write" operation or, alternatively, to retrieve information that already exist on the tape media during the "read" state. In either case, the tape is typically attached to a leader pin that is adapted to be engaged by a leader block that is part of the threading mechanism. The threading mechanism engages the leader pin by means of the leader block, and then mechanically threads the tape across air bearings that ore disposed on either side of read/write recording head. The threading mechanism conveys the leader block to a take-up hub.

Traditional leader blocks engage the leader pin of a tape medium from the side, that is, laterally. Thus, traditional leader blocks rely upon constant tension of the tape medium in order to maintain an engaged relationship. This presents a problem in several respects. On one hand, if the leader pin is improperly parked in the tape cartridge, the leader block may not even be able to engage the leader pin to withdraw the tape from the cartridge. In the event that the leader block does engage the leader pin and begins to pull the tape from the cartridge, misregistration of the leader pin in the leader block can result in the leader block's dropping the leader pin during the threading operation. Once the leader pin is lost, it cannot be recovered by the threading apparatus so that the equipment must be serviced or repaired. Not only is this expensive in cost due to the cost of repairs and down time, the lost leader pin can damage the read/write apparatus.

Even where the leader block properly engages the leader pin, there is still always the risk that some other event will cause a release of tension on the tape medium. For example, if a power outage occurs, tension is lost and the leader pin can fall out of the leader block. This results in the same issues of repair and damage noted above.

Accordingly, there is a need for an improved leader block assembly which can selectively releaseably engage the leader pin in a positive manner. There is need for a leader block that can positively engage the leader pin for virtually all types of threading assemblies and for the use of such a leader block in a tape transport apparatus. The present invention is directed to meeting these needs.

SUMMARY OF THE INVENTION

It is an object of the present invention to provide a new and useful leader block that may be used in threading assemblies on tape transport apparatus.

It is another object of the present invention to provide a new and useful method of threading a tape medium from a tape source through a read/write recording apparatus.

A further object of the present invention is to provide a leader block and method that positively engages the leader pin on the free end of a tape from a tape source, such as a tape cartridge.

Yet another object of the present invention is to provide a leader block that releaseably latches onto a leader pin so that the leader pin cannot be dropped in the event of loss of tension of tape during a tape threading operation.

Still a further object of the present invention is to provide a leader block that releaseably latches onto a leader pin wherein the leader pin may be controllably disengaged from the leader block only upon mechanically actuation thereof.

Yet another object of the present invention is to provide a leader block that will assist in re-parking a leader pin within a tape cartridge prior to engaging it so that a positive latching of the leader pin is accomplished by the leader block.

It is still a further object of the present invention to provide a leader block assembly that is simple in construction and easy to manufacture yet which positively engages a leader pin throughout the threading operation.

According to the present invention, then, a leader block is provided that is adapted to be advanced in a first direction to engage a leader pin on a tape medium. Broadly, the leader block comprises a body member and a latch member disposed on the body member. The latch member includes a catch piece that is relatively moveable with respect to the body member between an open position to permit engagement and disengagment with the leader pin and a closed position to retain the leader pin when the leader pin is engaged therein. The leader pin according to the present invention can be incorporated into a threading assembly that in turn is incorporated into a read/write apparatus. Both the threading assembly and the read/write apparatus make up additional aspects of the present invention.

Whether viewed as the leader block alone or in combination with a threading assembly or in combination with a read/write apparatus, the leader block of the present invention may have a leading edge portion that includes a pair of spaced apart engagement structures that are operative to engage the leader pin. The latch member then includes a pair of catch pieces that are respectively associated with the engagement structures. Whether one or a plurality of catch pieces are provided, they are biased toward the closed position. The engagement structures may include at least one stationary finger. Here, each catch piece cooperates with a respective finger to form an enclosed area when in the closed position yet forms an open area with an entryway when in an open position. However, it is preferred that the engagement structures include a pair of stationary fingers defining a slot therein.

In order to facilitate engagement of the catch piece with the leader pin, the catch piece includes a leading ramp portion that is operative to attack the leader pin as the leader block is moved in the first direction thereby to move the catch piece in the open position. There after, the catch piece, due to the biasing thereof, snap locks into the closed position about the leader pin. The catch piece may include an arcuate trailing edge portion so that, once it is in the closed position, the catch piece cannot become disengaged from the leader pin until positive actuation of the catch piece occurs.

In its more detailed presentation the leader block of the present invention includes a latch member in the form of a channel shaped piece in which the body member is nested. The body member includes first and second spaced apart engagement structures disposed on the leading edge portion with each of these engagement structures formed as a pair of stationary fingers having a slot therebetween. The latch member is pivotably disposed on the body member and includes first and second arms that terminate in catch piece with each catch piece being associated with respective one of the first and second engagement structures. The latch member is relatively movable with respect to the body member between an open position to permit each catch piece to interact with a respective finger to engage with and disengage from the leader pin. When in the open position, the latch member is spring biased toward the closed position with a restorative force. When in the closed position, the leader pin is retained in the leader block.

The latch member can include a central panel piece as it extends between the first and second arms thereby to form a channel structure within which the body member is nested. The spring piece may be formed as a wing that extends from the central panel piece and confronts the body member and flexes as the latch member pivots to the open position. The first and second arms, the central panel piece and the wing are preferably formed as a integral one-piece construction of a spring steel or other metal construction. The latch member is pivoted relative to the body member by means of an axial pin that is received in trunion mounts on each of the first and second arms. The latch member can include an actuator tab that is operative under an actuator force to pivot the latch member from the closed position to the open position against the restorative force.

The threading assembly according to the present invention includes one or more of the elements of the leader block structure described above. In addition, the threading assembly includes a primary guide track and a flexible conveyor member received in the primary guide track. A motor is then operative to reverseably drive the conveyor member in first and second directions. The leader block is secured to the conveyor member. In the exemplary embodiments, the conveyor member is selected from a group consisting of chains and belts. The threading assembly of the present invention may also include a secondary guide track formed as a mirror image of the primary guide track. The secondary guide track receives a portion of the leader pin therein for sliding movement as the conveyor member is driven in the first and second direction.

The threading assembly of the present invention also includes an actuator that is operative to engage the latch member of the leader block. The actuator is moveable between an active position wherein the actuator moves the catch piece into the open position and an inactive position wherein the restorative force of the latch member moves the catch piece into the closed position. As an example, the actuator may be a lever that is pivotally moveable between the active and inactive positions over a throw distance. The throw distance may be selectively adjustable. In order to advance the actuator from the inactive position to the active position, a cam is provided that pivots the actuator so that a prong portion of the actuator lever bears against the actuator tab on the latch member to pivot the first and second arms into the open position.

The present invention is also directed to a read/write apparatus adapted to receive spool of tape medium, such as a cartridge, and is operative to perform a read/write function thereon as the tape medium advances in a forward direction. The read/write apparatus of this invention includes a read/write recording head and first and second bearing members respectively located upstream and downstream of the read/write recording head in order to support the tape medium as it advances there across. The read/write apparatus includes a take up mechanism including a hub having an outer surface about which the tape medium is to be wound. A rotatable drive is then operative to rotate the hub thereby to wind the tape medium thereon. The read/write apparatus includes a threading assembly including a leader block adapted to engage the free end of tape member. While a leader block is constructed as described above, and the threading assembly can be as described above or other conventional threading assemblies.

Finally, the present invention is directed to a method of threading a tape medium from a tape source through a read/write recording apparatus wherein the tape medium has the leader pin associated therewith. The broad method of the present invention includes a step of advancing a releaseably latchable leader block into abutment with the leader pin and engaging the leader pin with the leader block. The method includes the step of latching the leader block to capture the leader pin therein and then advancing the leader block to a winding hub. The hub is rotated thereby to wind the tape medium thereon. After a portion of the tape medium has been wound on the hub, then method includes the step of rotating the hub to unwind the tape medium from the winding surface and to rewind the tape medium into the tape source. The leader block is returned to a location adjacent the tape source and leader pin is then unlatched from the leader block. In addition to these steps the exemplary method may also include the step of pressing the leader block against the leader pin to snap lock the leader pin therein to accomplish the step of latching the leader block to capture the leader pin. The step of unlatching the leader pin may be accomplished by advancing an actuator against a portion of the leader block to pivot a latch portion thereof out of engagement with a leader pin.

These and other objects of the present invention will become more readily appreciated and understood from a consideration of the following detailed description of the exemplary embodiment of the present invention when taken together with the accompanying drawings, in which:

BRIEF DESCRIPTION OF THE DRAWINGS

FIG. 7 is an exploded view in perspective showing the leader block according to the exemplary embodiment of the present invention;

FIG. 8 is a perspective view of the leader block of FIG. 7 shown in the closed position advancing on a leader pin;

FIG. 9 is a perspective view of the leader block of FIG. 8 moving to an open position to partially engage a leader pin;

FIG. 10 is a perspective view of a lever actuator used in the threading assembly according to the present invention;

FIG. 11 is a perspective view of a cam assembly used to actuate the leader block of FIGS. 6–9;

FIG. 12 is an exploded perspective view of the cam assembly of FIG. 11;

FIG. 13 is an end view in elevation of the cam assembly of FIG. 11;

FIG. 14(a) is a side view in elevation showing the cam assembly of FIGS. 11–13 with the lever actuator of FIG. 10 shown in an inactive state with respect to the lever actuator and leader block and FIG. 14(b) is a top plan view thereof;

FIG. 15(a) is a side view in elevation showing the cam actuator in an active state with respect to the lever actuator and leader block and FIG. 15(b) is a top plan view thereof;

DETAILED DESCRIPTION OF THE EXEMPLARY EMBODIMENTS

The present invention broadly concerns tape transport apparatus used in the data storage industry. Such tape transport apparatus employs a tape medium in which data may be placed. Typically the tape medium resides on a storage reel, which may be in the form of a cartridge. The tape transport apparatus is operative, when a storage reel is mounted thereon, to transport the tape medium in a transport direction across a read/write transducer in order to place or access data on the tape. While the present invention is described specifically with respect to magnetic tape media, it should be understood tha the principals described herein may be employed with other type media without restriction. For example, the invention may be used with optical tape as opposed to magnetic tape. Moreover, the term "read/write transducer" as used herein should be understood to refer to a write transducer, a read transducer or a transducer that is able to perform both reading and writing functions.

In order to properly mount a tape medium in the read/write apparatus, automated threading assemblies are usually incorporated in such equipment. These threading assemblies function to engage a leader pin that is secured to the leading end of the tape. The threading assembly engages the leader pin and advances the leader pin in a first direction to a take hub or reel. During this operation, the threading assembly typically advances the tape medium across air bearings and the read/write transducer. Once threaded, rotation of the take up hub and the tape source are coordinated so that the tape is advanced to a desired location. When the read/write operation is completed, the process is reversed, and the threading apparatus returns the tape and the leader pin to the tape source, such as within the cartridge housing. The present invention is particularly directed to a threading assembly for a tape transport apparatus and, especially, the present invention is directed to a new and useful leader block that is used to engage the leader pin.

Figure 1:
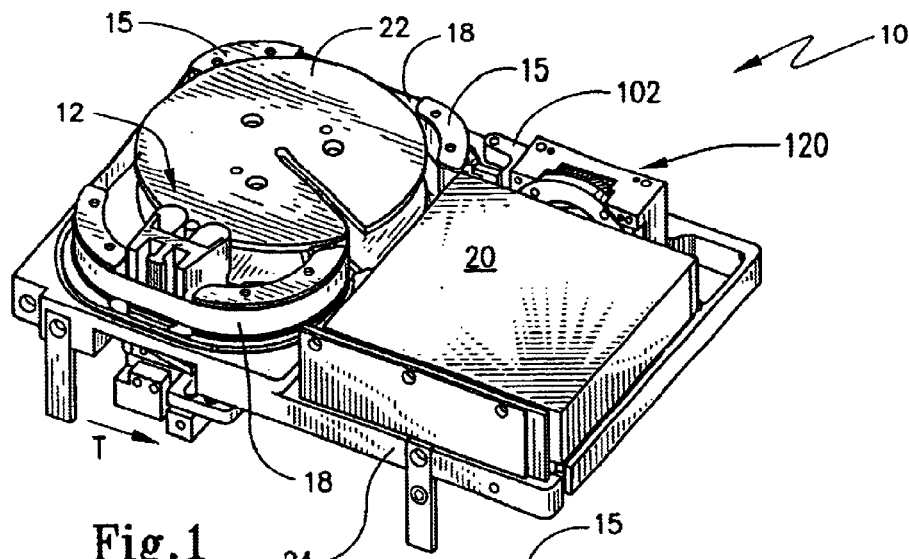
FIG. 1 is a perspective view of the tape drive apparatus according to the present invention incorporating the threading assembly and leader block of the present invention shown with the tape apparatus receiving a tape source in the form of a tape cartridge.
Figure 2:
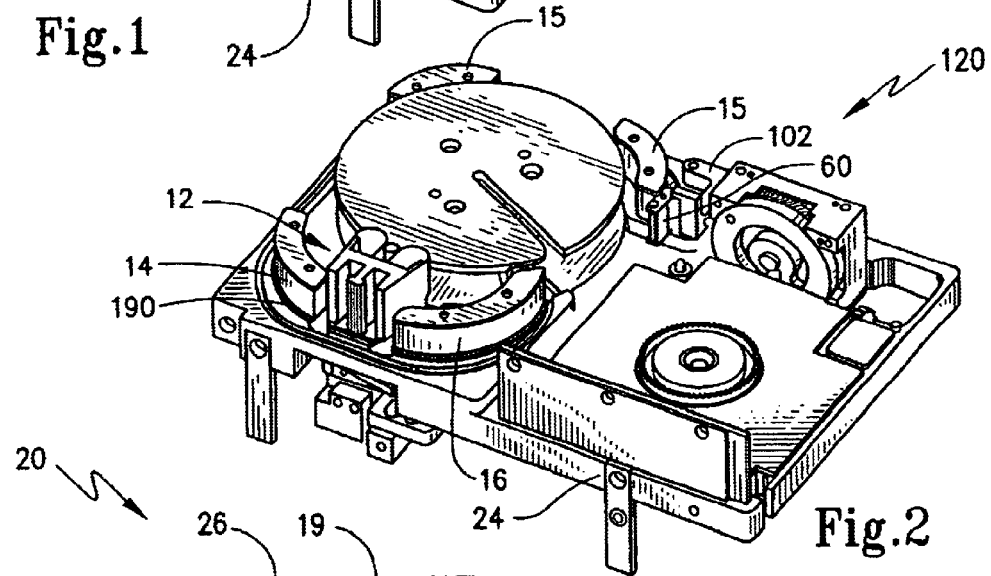
FIG. 2 is a perspective view of the tape drive apparatus of FIG. 1 shown with the tape cartridge removed therefrom.

With reference to FIGS. 1 and 2, diagrams of a representative tape transport or read/write apparatus 10 are shown. Apparatus 10 includes a read/write transducer 12 that is flanked by an upstream air bearing 14 and a down stream air bearing 16 when a tape 18 is transported there across. Additional air bearings 15, may be employed as needed. Tape 18 is advanced in the direction of arrow "T", and it is threaded so that it engages a take up reel 22. Take up reel 22 is rotatably journaled on frame 24 that is rotated by means of the take up motor as is known in the art. After performing the desired read/write function, the tape that has been previously wound as a tape pack on the take reel 22 may be rewound in the cartridge 20 by means of a rewind motor, also as is known in the art.

Figure 3:
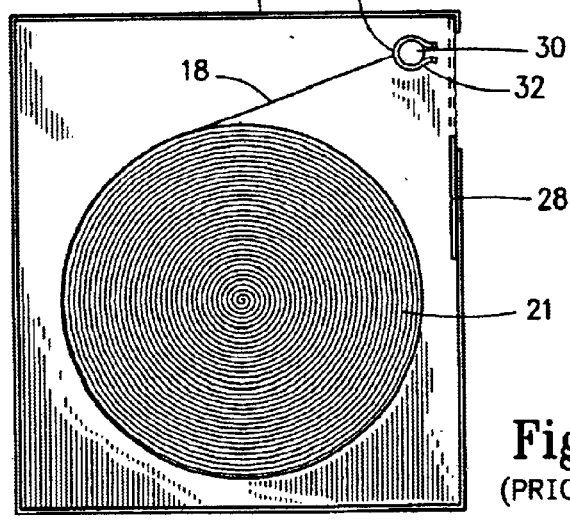
FIG. 3 is a top view in cross-section showing the interior of the tape source, that is, a tape cartridge, such as that used in FIG. 1.

With reference to FIG. 3, a traditional tape cartridge 20 according to the prior art is illustrated. Here, cartridge 20 includes a housing 26 that has an access door 28 shown in an open position. Tape 18 is shown wound on a spool 21 that may also be referred to as a "tape pack". Free end 19 of tape 18 is fastened to a leader pin 30 that is normally parked and held in position by means of spring clips 32.

Figure 4A:
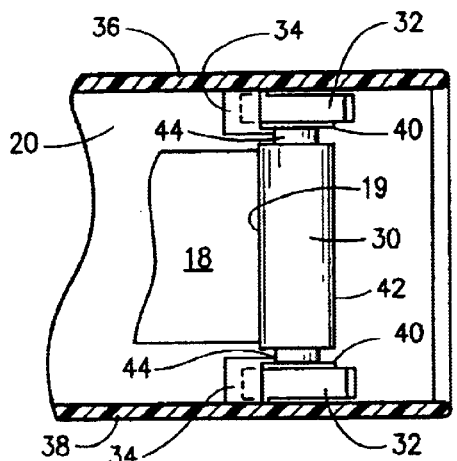
FIG. 4(a) is a cross-sectional view of the leader pin in the tape cartridge of FIG. 3 shown and properly registered or "parked" therein.

The engagement of leader pin 30 and spring clips 32, according to the prior art, is illustrated in FIG. 4(a). Here, it may be seen that spring clips 32 are mounted to supports 34 formed on upper and lower panels 36 and 38 of housing 26. Spring clips 32 are C-shaped in configuration and receive the head portions 40 of leader pin 30. To this end, it should be understood that leader pin 30 typically includes a cylindrical main body 42 on which head portions 40 are actually positioned by way of neck portions 44.

Figure 4B:
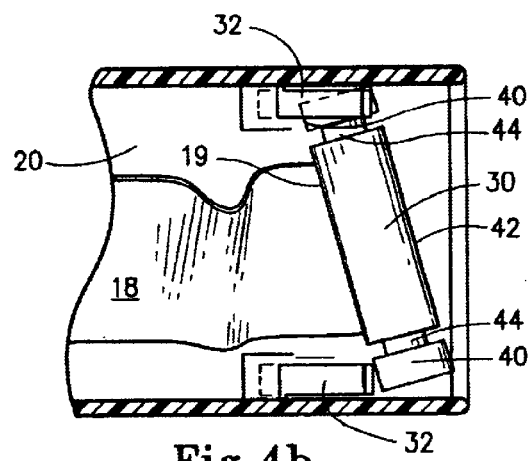
FIG. 4(b) is a cross-sectional view similar to FIG. 4(a) but showing a common misalignment of the leader pin.

As is shown in FIG. 4(b), a problem can result if leader pin 30 is misregistered with respect to spring clips 32. In this figure, it may be seen that leader pin 30 is partially dislodged from spring clips 32 so that it is misalignment in a canted manner, and not properly parked in spring clips 32. This situation can occur, for example, should the threading assembly of read/write apparatus 10 not properly return leader pin 30 to cartridge 20 but, as is more often the case, results should the tape cartridge is excessively jarred as may occur when tape cartridge 20 is inadvertently dropped.

Figure 5:
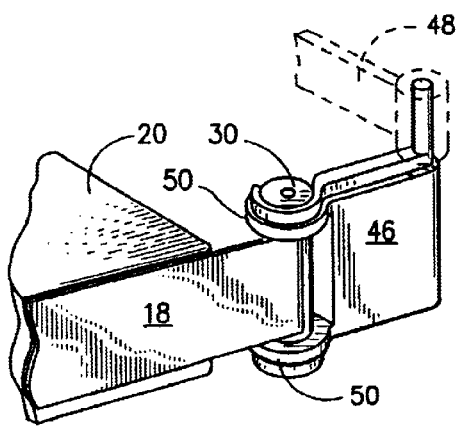
FIG. 5 is a perspective view, partially cut away, showing a leader block engaging a leader pin according to the prior art.

With reference now to FIG. 5, a typically leader block used with leader pin 30 is shown. Here, leader block 46 is shown mounted to a threading arm 48 (shown in phantom). Leader block 46 includes a pair of hooks 50 that are adapted to extend partially around leader pin 30 and reside in neck portions 44. This structure relies on tape tension to maintain engagement. With this assembly, it is not difficult to engage leader pin 30 when leader pin is properly parked in cartridge 20 as is shown in FIG. 4(a). However, should the leader pin be misalignment as is shown in FIG. 4(b), it is very difficult if not impossible for leader block 46 to engage leader pin 30. This creates a problem for automated tape library systems as well as for manual systems. Moreover, even if one of the hook portions 50 is successful in engaging the leader pin 30, often the other hooked portion 50 will not be engaged when leader pin 30 has been initially misalignment as shown in FIG. 4(b). When this occurs, it is possible that, during the threading operation, leader pin 30 becomes disengaged from the threading assembly causing damage to the equipment and the necessity of expensive repairs. This problem results from the fact that leader block 46 of the prior art has to engage leader pin 30 from the side. When leader pin 30 is not properly parked, proper registration may only occur by happenstance. In addition if, during a threading or unthreading operation power if lost, the tension on tape 18 is lost, disengagement of leader block 46 from leader pin 30 often results.

The present invention seeks to alleviate some of the issues involved in properly engaging the leader pin. This is accomplished by an improved leader block 60 best shown in FIGS. 6–9. In these figures, it may be seen that leader block 60 includes a body member 62 and a latch member 64 that is disposed on body member 62 and retained thereon by axial pin 66. A mounting member in the form of rod 68 is provided to interconnect leader block 60 to the threading assembly. With reference again to FIGS. 6–9, it may be appreciated that body member 62 has a leading edge portion 70 that includes a pair spaced apart engagement structures 72 that are operative to engage the leader pin, and, in particular, are adapted to engage neck portion 44 thereof. Each of engagement structures 72 include at least one stationary finger, but, as is shown in these figures, each engagement structure 72 be formed by a pair of parallel, opposed fingers 74 and 76 that define a slot 78 therebetween. Slot 78 has a width that is slightly larger than the diameter of neck 44 of leader pin 30. Engagement structures 72 loosely engage leader pin 30 and allow leader pin 30 to move into and out of the open areas by slots 78 through the entryways thereto.

In order to selectively retain or release leader pin 30, latch member 64 is provided by at least one but preferably two catch pieces that are relatively movable with respect to the body member 62 between an open position to permit engagement and disengagement with the leader pin and a closed position to retain the leader pin when the leader pin is engaged in slots 78. With reference to FIG. 7, it may be seen that latch member 64 includes a pair of arms 80 and 82 that are joined together by a central panel piece 84 so as to form a channel structure within which body member 62 is to be nested as is shown, for example, in FIG. 6(a). To this end, each arm portion 80 includes trunion mounts, such as trunion mount 86 shown in FIG. 7 that have openings 88 that register with bore 90 in body member 62 so that axial pin 66 may be press fit therein to secure latch member 64 to body member 62. It should be understood that a trunion mount 86 is formed on arm 82 in a manner similar to that shown in FIG. 7 with respect to arm 80.

Figure 6A:
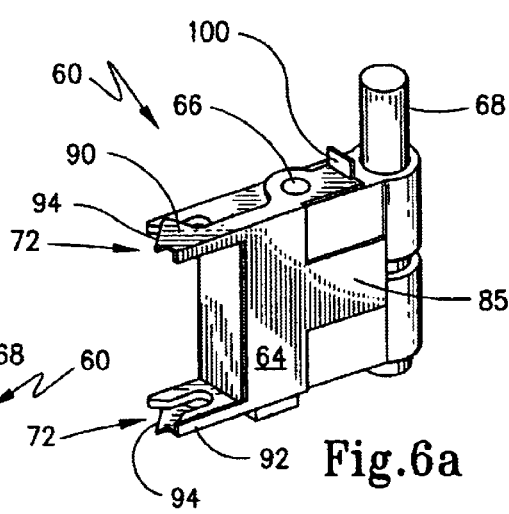
FIGS. 6(a) and 6(b) are perspective views showing the leader block according to the exemplary embodiment of the present invention with FIG. 6(a) showing the leader block in a closed position and FIG. 6(b) showing the leader block in an open position.
Figure 6B:
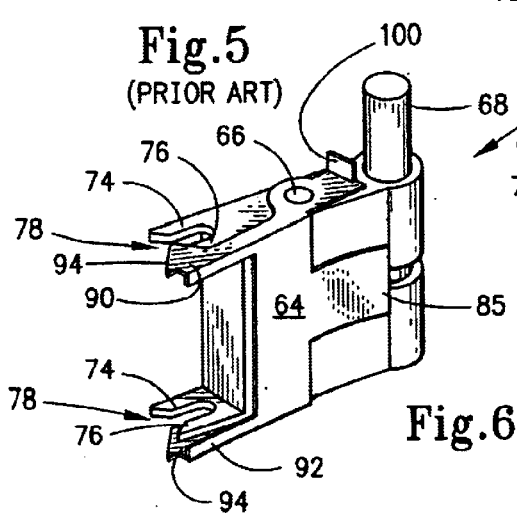
Figure 16:
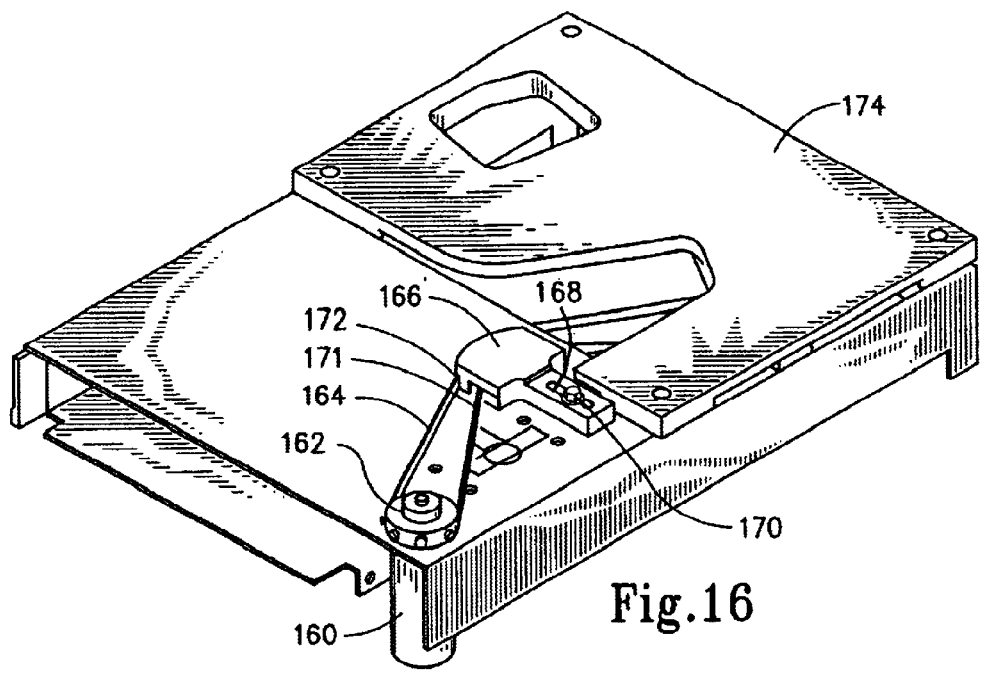
FIG. 16 is a perspective view of the tape cartridge housing and the tape threading assembly of the exemplary embodiment of the present invention.

Each of arms 80 and 82 is provided with a catch piece in the form of a triangularly configured end portion 90 and 92 respectively on arms 80 and 82. Triangular end portions 90 and 92 each include a leading ramp portion or edge 94 and an arcuate trailing edge portion 96 the function of which will soon become apparent. With reference to FIGS. 6(*a*) and 6(*b*), it may be seen that each of the catch pieces formed by triangular end portions 90 and 92 are relatively movable with respect to body member 62 between a closed position shown in FIG. 6(*a*) and an open position shown in FIG. 6(*b*). When in the open position, leading block 60 may engage and disengage with the leader pin 30. When in the closed position, leader pin 30 is retained by leader block 60. To this end, each of the catch pieces formed by triangular end portions 90 and 92 are biased toward the closed position. Here, latch member 64 is provided with a flexible, resilient wing piece 85 that abuts body member 62 in confronting relation when it is in a first position such as shown in FIG. 6(*a*) and FIG. 8. However, due to the pivotal mounting of latch member 64 on body member 62 by axial pin 66, latch member 64 may be pivoted so that arms 80 and 82 moves the catch pieces in the form of end portions 90 and 92 between the closed and open position. When moved to the open position, as is shown in FIG. 6(*b*) and FIG. 9, wing piece 85 applies a biasing or restorative force tending to move the latch member 64 toward the first position thereby to bias the catch pieces into the closed position. Arms 80, 82, central panel piece 84 and wing piece 85 are formed as an integral one-piece construction of spring steel.

From the foregoing description, it should be appreciated that each of the engagement structures includes at least one, but preferably two stationary fingers. Each of the catch pieces in the form of end portions 90 and 92 of arms 80 and 82 cooperative with these stationary fingers to form an enclosed area when in the closed position yet form an open area with an entryway when in the open position. When in the open position leader pin 30 can be engaged and removed from slots 78. However, when in the closed position, the catch pieces prevent this inadvertent disengagement of the leader pin 30 from leader block 60. To this end, each of the catch pieces is operative in the closed position to close the entryway of the respective slot 78. Arcuate trailing edge portions 96 of end portions 90 and 92 thus form a perimeter for the closed area when in the closed position. Thus, during threading leader pin 30 will remain engaged even under a loss of tape tension.

It may now be appreciated that leading ramp portions 94 on end portions 90 and 92 facilitate the initial engagement of leader block 60 with leader pin 30. As is shown best in FIG. 8, as leader block 60 is advanced towards leader pin 30 in the direction of arrow "B" ramp portions 94 will attack neck portions 44 on the leader pin 30. Due to the angled configuration of ramp portions 94, latch member 64 will move toward the open position thereby flexing wing piece 85 against body member 62. When neck portions 44 pass the apices 98 of the catch pieces, the restorative force provided by wing piece 85 will cause latch member 64 to move to the closed position so that arcuate edge portions 96 close the entryway to the open areas provided by slots 78. Ramp portions 94 thus attack the leader pin as the leader block is moved in the first direction represented by arrow "B".

It should be recognized at this juncture that leader block 60 engages leader pin 30 by direct linear advancement onto leader pin 30 rather than engaging leader pin 30 from the side, as was the case with the prior art structure shown in FIG. 5. Because of this, should leader pin 30 be dislodged as shown in FIG. 4(*b*), leader block 60 will usually act to push leader pin 30 back into a properly parked orientation as shown in FIG. 4(*a*) as it advances thereagainst. When this occurs, ramps 94 attack necks 44 and engagement of leader pin 30 occurs. When leader block 60 is withdrawn in a second direction opposite "B", leader pin 30 is captured and is removed from cartridge 20 so that it may threaded through the tape transport apparatus 10.

Upon returning to redeposit leader pin 30 in cartridge 20, leader block 60 positively engages head portions 40 of leader pin 30 in spring clips 32. However, at this position, it is necessary to mechanically disengage the catch pieces formed by end portions 90 and 92 of arms 80 and 82 from the leader pin. To this end, an actuator tab 100 is disposed on arm 80 at an end opposite triangular end portion 90. By laterally pressing actuator tab 100, as may be shown in FIG. 14(*b*) and FIG. 15(*b*), latch 64 is mechanically moved to the open position.

Accordingly, it is necessary to provide read/write apparatus 10, as well as the threading assembly associated therewith, with a mechanical actuator that can interact with actuator tab 100 to perform this function. As is shown in FIGS. 10, 14 and 15, the actuator according to the exemplary embodiment of the present invention is in form of a lever 102 that includes an L-shaped base 104 that includes a mounting bore 106 at the end of one leg thereof. Lever 102 is pivotal secured to frame 24 by means of a suitable bearing bolt 108 extending through opening 106. An upright portion 110 of lever 102 is disposed at the extreme end of the second leg of L-shaped base 104 and has a prong portion 112 projecting therefrom. A throw adjustment screw 114 is threadably received in L-shaped base 102 on a lateral edge thereof, with this adjustment screw 114 providing a cam follower as described more thoroughly below. When leader block 60 is in a location where the mechanical release of leader pin 30 is desired, prong portion 112 confronts actuator tab 100 so that mechanical advancement of prong portion 112 against actuator tab 100 pivots latch member 62 into the open position.

Accordingly, it is necessary to somehow provide an actuating force on lever 102. To this end, a cam assembly is provided and is best shown in FIGS. 11–13. The cam assembly is shown mounted to frame 24 in FIGS. 1 and 2. With reference first to FIGS. 1 and 2, it may be seen that cam assembly 120 is supported on frame 24 and is proximate to lever 102 that is pivotally secured thereto. Leader block 60, when in the position to release leader pin 30, it is proximate to actuator lever 102, as is shown in FIG. 2. It should be understood that cam assembly 120 may perform numerous operations necessary for the mechanical operation of read/write apparatus 10 with only one of the functions being that involved in moving latch member 64 to the open position. For example, cam assembly 120 maybe used to mount and demount cartridge 20 from read/write apparatus 10.

In any event, as is shown FIGS. 11–13, cam assembly 120 includes a gear box 122 which mounts a cam element 124 and an annular gear 126 on an axial pin 128. A pawl element 130 includes a first cam follower 132 at one end. A second finger 134 is located on pawl 80. Plate 136 mounts to gear box 122 to rotatably secure axially pin 128 between suitable bearings 142 and thus secure cam element 124 and pawl element 130 in the interior of gear box 122. Plate 136 includes a slot 140 is adapted to engage finger 134. Finger 134 is dimensioned sufficiently so that a portion thereof projects from slot 140 in order to engage the cartridge handing slot of cartridge 20 in order to move the tape cartridge 20 between an extended and retracted position once it is mounted in read/write apparatus 10. In order to mechanically drive cam element 124, a drive motor 144 is provided that engages a worm gear 146 that engages annular gear 126. Worm gear 146 operates to rotate annular gear 126 and thus cam element 124 that is secured thereto by means of screws 148.

As noted above, cam assembly 120 and, in particular, cam element 124 performs several functions in docking a cartridge with read/write apparatus 10. For purposes of the present invention, though, cam assembly 120 and cam element 124 interact with actuator lever 102 to also move leader block 60 into an open position. To this end, as is seen in FIG. 13, the edge of cam element 124 is provided with a cam lobe 150 including ramp portions 152 the operation of lobe 150 may be appreciated more thoroughly, however, with reference to FIGS. 14 and 15. In FIGS. 14(*a*) and 14(*b*) it may be seen that cam element 124 is in an initial position wherein lobe 150 of cam element 124 does not engage adjustment screw/cam follower 114. In this position, lever 102 is spring biased away from leader block 60 so that prong portion 112 does not engage actuator tab 100. However, as is shown in FIGS. 15(*a*) and 15(*b*), when cam element 120 is rotated, lobe 150 engages screw 114 so as to pivot actuator lever 102 in the direction of arrow "X". Therefore, screw 114 acts as a cam follower. Upon rotation of lever 102, prong portion 112 of lever 102 applies an actuating force against actuator tab 100 to move latch member 64 from the closed position shown in FIG. 14(*b*) to the open position shown in FIG. 15(*b*). That is, arms 80 and 82 of latch member 64 are moved to the open position in the direction of arrow "Y". Screw 114 is adjustably variable as to its relative height with respect to lever 102 so the throw distance of lever 102 may be selectively adjustable. The cam dwell of lobe 150 is about 70° of rotation in this embodiment.

Figure 17:
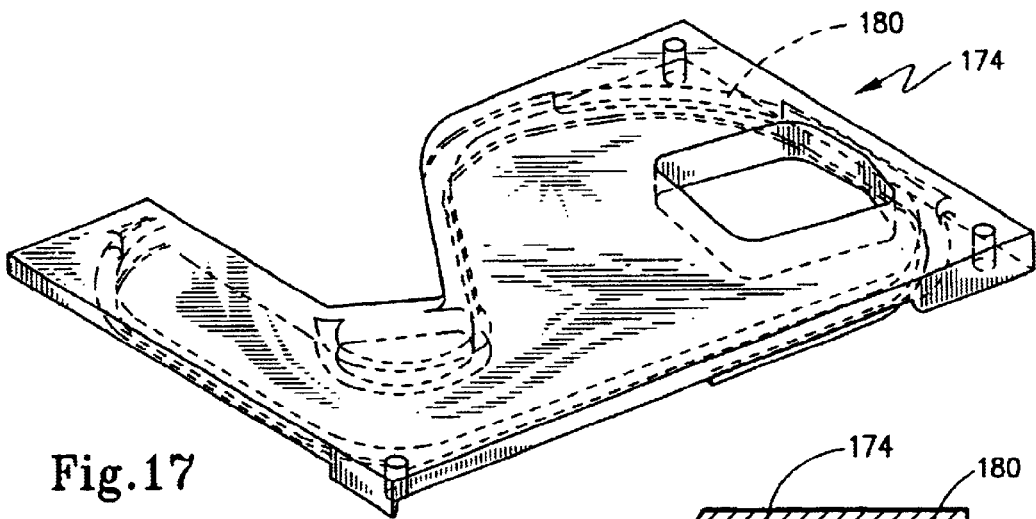
FIG. 17 is a perspective view of the threading plate of the present invention with the threading channel shown in phantom.
Figure 18:
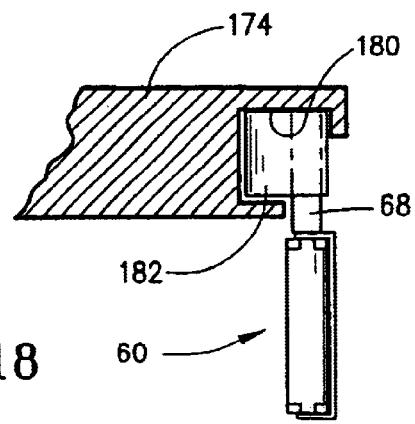
FIG. 18 is a cross-sectional view showing the leader block of the present invention associated with the threading channel.

Having now described the leader block as well as the actuating structure, it should be appreciated that the present invention is also directed to a threading assembly for the tape transport apparatus 10 with this threading assembly being operative to engage a leader pin on a tape medium. The threading assembly of the present invention preferably uses a flexible conveyor member that is either a chain or belt drive, although a chain drive is believed to be a superior construction due to the increased frictions experienced by belt drives. The threading assembly may best be appreciated with reference to FIGS. 2 and 16–18. In these figures, it may be appreciated that the threading assembly includes a motor 160 which drives a sprocket 162 and a continuous loop conveyor in the form of chain 164. Chain 164 extends across a lubricous bearing 166 that is providing with a mounting slot 168 to secure to a sub-frame by means of a screw 170 so that suitable tensioning on chain 164 may be provided by bearing surfaces 171 and 172. Chain 164 extends through a threading channel 180 shown in phantom in FIG. 17 when threading channel 180 forms serpentine path in guide plate 174. As is shown in FIG. 18, threading channel 180 in guide plate 174 is sized to receive a carriage piece 182 that may track around the perimeter of guide plate 174. Carriage piece 182 mounts to rod 68 of leader block 60 so that, upon reciprocal movement of chain 164, leader block 60 may be reciprocally advanced through tape transport apparatus 10 reversibly in first and second directions. A secondary guide track 190 is formed as a mirror image of primary guide track, in the form of threading channel 180, with the secondary guide track being formed as a mirror image thereof. The secondary guide track 190 is best shown in FIG. 2, and it should be understood that this secondary guide track 190 may receive a head portion 40 of leader pin 30 for sliding movement as the chain 164 is advanced in tape transport apparatus 10.

Chain 164 thus advances the leader block 60 that, when connected to leader pin 30, acts to thread the tape around air bearings 14, 15 and 16 and across read/write head 12 so it may be engaged by take up hub 22. The tape medium may be then wound on take up hub 22 so that information may be transferred to or read from tape 18 as it passes over read/write head 112. After completion of the read/write task, the tape 18 is unwound off of hub 22 and the end of the tape 12 is then reversed through the threading channel 180 to be returned to the position shown in FIG. 2 where lever actuator 102 may be activated to release leader pin 30 from leader block 60.

While it is preferred that the threading assembly include the flexible conveyor member that drives leader block 60, it should be understood that conventional threading assemblies of any type now known or hereafter developed may well be used to advance leader block 60 during the threading and unthreading operations. Thus, for example, leader block 60 could be used with a threading arm of 48 shown in FIG. 5 or such other structure as would be apparent to the ordinarily skilled artisan.

From the foregoing, also, it should be appreciated that the present invention is directed to a read/write apparatus that is adapted to receive a spool of tape medium and is operative to perform a read/write function thereon as the tape medium advances in a forward direction. Here, the read/write apparatus includes a read/write recording head, such as head 12, and at least first and second bearing members located, respectively, at an upstream location and a downstream location relative to the read/write recoding head. A take up mechanism is then providing, such as hub 22, that has an outer surface about which the tape medium is to be wound, and a rotatable drive is operative to rotate the hub thereby to wind the tape medium thereon. The read/write apparatus further includes a threading assembly of the type described above.

Also, it should be appreciated that the present invention is directed to a method of threading a tape medium from a tape source through a read/write recording apparatus wherein the tape medium has a leader pin associated therewith. The method according to the present invention can include any of the steps inherent in the above described mechanical structure. In particularly, though, the method of the present invention includes a first step of advancing a releaseably latchable leader block into abutment with the leader pin and engaging the leader pin with the leader block. The leader block is latched to capture the leader pin therein after which the leader block is advanced to a winding hub. The winding hub is then rotated to wind the tape medium thereon. After a portion of tape medium has been wound on the hub, the hub is rotated to unwind the tape medium from the winding surface and to rewind the tape medium back onto the tape source. The leader block is return to a location adjacent to the tape source after which the leader pin is unlatched from the leader block.

This broad method set forth above can be accomplished wherein the step of latching the leader block is accomplished by pressing the leader block against the leader pin to snap lock the leader pin therein. Further, the step of unlatching the leader pin from the leader block may be accomplished by advancing an actuator against the portion of the leader block to pivot a latch portion thereof out of engagement with the leader pin.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein.

I claim:

1. A leader block adapted to be advanced in a first direction and to engage a leader pin on a tape medium, comprising:
   (A) a body member; and
   (B) a latch member pivotally disposed on said body member, said latch member including a catch piece relatively movable with respect to the body member between an open position to permit engagement and disengagement with the leader pin and a closed position to retain the leader pin when the leader pin is engaged therein.

2. A leader block according to claim 1 wherein said catch piece is biased toward the closed position.

3. A leader block according to claim 1 wherein said latch member is formed as a channel-shaped piece in which said body member is nested.

4. A leader block according to claim 3 wherein said latch member is movable between first and second positions such that said catch piece is respectively in the closed and open positions, said latch member including a flexible, resilient wing piece that abuts said body member when in the first position and in the second position is operative to apply a biasing force to move said latch member toward the first position thereby to bias said catch piece into the closed position.

5. A leader block according to claim 1 wherein said latch member includes an actuator tab operative under an actuating force to move said catch piece from the closed position to the open position.

6. A leader block according to claim 1 wherein said catch piece includes a leading ramp portion operative to attack said leader pin as the leader block is moved in the first direction and thereby move said catch piece into the open position.

7. A leader block according to claim 6 wherein said catch piece includes an arcuate trailing edge portion.

8. A leader block adapted to be advanced in a first direction and to engage a leader pin on a tape medium, comprising:
   (A) a body member having a leading edge portion including a pair of spaced-apart engagement structures operative to engage the leader pin; and
   (B) a latch member disposed on said body member, said latch member including a pair of catch pieces respectively associated with said engagement structures and relatively movable with respect to the body member between an open position to permit engagement and disengagement with the leader pin and a closed position to retain the leader pin when the leader pin is engaged therein.

9. A leader block according to claim 8 wherein each of said engagement structures includes at least one stationary finger, each said catch piece cooperating with a respective said finger to form an enclosed area when in the closed position yet forming an open area with an entryway when in the open position.

10. A leader block according to claim 9 wherein each of said engagement structures includes a pair of stationary fingers defining a slot therebetween.

11. A leader block adapted to be advanced by a threading assembly in a tape transport apparatus in a first direction to engage and disengage a leader pin on a tape medium and in a second direction to thread the tape medium through the tape transport apparatus, comprising:
   (A) a body member supporting a mounting member adapted to secure to the threading assembly and a leading edge portion, said body member including first and second spaced-apart engagement structures disposed on said leading edge portion operative to engage the leader pin when said body member is advanced in the first direction, each said engagement structure including at least one finger projecting from said body member;
   (B) a latch member pivotally disposed on said body member, said latch member including first and second arms each terminating in a catch piece associated with a respective one of said first and second engagement structures, said latch member relatively movable with respect to the body member between an open position to permit each said catch piece to interact with a respective finger to engage with and disengage from the leader pin and a closed position to retain the leader pin when the leader pin is engaged therein; and
   (C) a spring piece operative to bias said latch member into the closed position with a restorative force.

12. A leader block according to claim 11 wherein each said catch piece cooperates with a respective said finger to form an enclosed area when in the closed position yet forming an open area when in the open position.

13. A leader block according to claim 12 wherein each of said engagement structures includes a pair of opposed fingers forming a slot therebetween and an entryway into the slot, the slot being sized and adapted to receive a portion of the leader pin therein, each said catch piece operative in the closed position to close the entryway of a respective slot.

14. A leader block according to claim 12 wherein each said catch piece has an arcuate edge portion forming a perimeter for the closed area when in the closed position.

15. A leader block according to claim 11 wherein said catch piece includes a leading ramp portion operative to attack said leader pin as the leader block is moved in the first direction and thereby move said catch piece into the open position against the restorative force.

16. A leader block according to claim 11 wherein said latch member includes a central panel piece extending between said first and second arms thereby to form a channel structure within which said body member is nested.

17. A leader block according to claim 16 wherein said spring piece is formed as a wing that extends from said central panel piece.

18. A leader block according to claim 17 wherein said first and second arms, said central panel piece and said wing are formed as an integral one-piece construction.

19. A leader block according to claim 11 including an axle pin disposed on said body member and wherein each of said first and second arms includes a trunion mount operative to secure to said axle pin.

20. A leader block according to claim 11 wherein said latch member includes an actuator tab operative under an actuating force to pivot said latch member from the closed to the open position against the restorative force.

21. A threading assembly for a tape transport apparatus and operative to engage a leader pin on a tape medium, comprising:
   (A) a primary guide track;
   (B) a flexible conveyor member received in said primary guide track;

(C) a motor operative to reversibly drive said conveyor member in first and second directions; and
(D) a leader block secured to said conveyor member, said leader block including:
   (1) a body member; and
   (2) a latch member pivotally disposed on said body member, said latch member including a catch piece relatively movable with respect to the body member between an open position to permit engagement and disengagement with the leader pin and a closed position to retain the leader pin when the leader pin is engaged therein.

22. A threading assembly according to claim 21 wherein said conveyor member is selected from a group consisting of chains and belts.

23. A threading assembly according to claim 21 including a secondary guide track formed as a mirror image of said primary guide track, said secondary guide track receiving a portion of the leader pin therein for sliding movement as said conveyor member is driven in the first and second directions.

24. A leader block according to claim 21 wherein said body member has a leading edge portion including a pair of spaced-apart engagement structures operative to engage the leader pin, said latch member including a pair of catch pieces respectively associated with said engagement structures.

25. A leader block according to claim 24 wherein each of said engagement structures includes at least one stationary finger, each said catch piece cooperating with a respective said finger to form an enclosed area when in the closed position yet forming an open area with an entryway when in the open position.

26. A threading assembly according to claim 21 wherein said catch piece is biased toward the closed position with a restorative force.

27. A threading assembly according to claim 26 including an actuator operative to engage said latch member movable between an active position wherein said actuator moves said catch piece into the open position and an inactive position wherein the restorative force moves said catch piece into the closed position.

28. A threading assembly according to claim 26 wherein said latch member includes an actuator tab operative under an actuating force to move said catch piece from the closed position to the open position against the restorative force.

29. A threading assembly according to claim 28 including an actuator movable between an active position wherein said actuator engages said actuator tab to move said catch piece into the open position and an inactive position wherein the restorative force moves said catch piece into the closed position.

30. A threading assembly according to claim 29 including a cam operative to advance said actuator from the inactive position to the active position.

31. A threading assembly according to claim 29 wherein said actuator is constructed as a lever pivotally movable between the active and inactive positions over a throw distance.

32. A threading assembly according to claim 31 wherein the throw distance is selectably adjustable.

33. A threading assembly for a tape transport apparatus and operative to engage a leader pin on a tape medium, comprising:
(A) a primary guide track;
(B) a flexible conveyor member received in said primary guide track;
(C) a motor operative to reversibly drive said conveyor member in first and second directions; and
(D) a leader block mechanically linked to said conveyor member, said leader block including:
   (1) a body member supporting a mounting member adapted to secure to said flexible conveyor member and having a leading edge portion, said body member including first and second spaced-apart engagement structures disposed on said leading edge portion operative to engage the leader pin when said body member is advanced in the first direction, each said engagement structure including at least one finger projecting from said body member;
   (2) a latch member pivotally disposed on said body member, said latch member including first and second arms each terminating in a catch piece associated with a respective one of said first and second engagement structures, said latch member relatively movable with respect to the body member between an open position to permit each said catch piece to interact with a respective finger to engage with and disengage from the leader pin and a closed position to retain the leader pin when the leader pin is engaged therein; and
   (3) a spring piece operative to bias said latch member into the closed position with a restorative force.

34. A threading assembly according to claim 33 wherein said conveyor member is selected from a group consisting of chains and belts.

35. A threading assembly according to claim 33 including a secondary guide track formed as a mirror image of said primary guide track, said secondary guide track receiving a portion of the leader pin therein for sliding movement as said conveyor member is driven in the first and second directions.

36. A threading assembly according to claim 33 including an actuator operative to engage said latch member movable between an active position wherein said actuator moves said latch member into the open position and an inactive position wherein the restorative force moves said catch piece into the closed position.

37. A threading assembly according to claim 36 wherein said latch member includes an actuator tab operative under an actuating force to move said latch member from the closed position to the open position against the restorative force.

38. A threading assembly according to claim 37 including an actuator movable between an active position wherein said actuator engages said actuator tab to move said catch piece into the open position and an inactive position.

39. A threading assembly according to claim 38 including a cam operative to advance said actuator from the inactive position to the active position.

40. A threading assembly according to claim 38 wherein said actuator is constructed as a lever pivotally movable between the active and inactive positions over a throw distance.

41. A threading assembly according to claim 40 wherein the throw distance is selectably adjustable.

42. A threading assembly according to claim 33 wherein each said catch piece cooperates with a respective said finger to form an enclosed area when in the closed position yet forming an open area when in the open position.

43. A threading assembly according to claim 42 wherein each of said engagement structures includes a pair of opposed fingers forming a slot therebetween and an entryway into the slot, the slot being sized and adapted to receive a portion of the leader pin therein, each said catch piece operative in the closed position to close the entryway of a respective slot.

44. A threading assembly according to claim 33 wherein said catch piece includes a leading ramp portion operative to attack said leader pin as the leader block is moved in the first direction and thereby move said catch piece into the open position against the restorative force.

45. A threading assembly according to claim 33 wherein said latch member includes a central panel piece extending between said first and second arms thereby to form a channel structure within which said body member is nested.

46. A threading assembly according to claim 45 wherein said spring piece is formed as a wing that extends from said central panel piece.

47. A read/write apparatus adapted to receive a spool of tape medium having a leader pin on a free end thereof, said read/write apparatus operative to perform a read/write function thereon as said tape medium advances in a forward direction, comprising:
- (A) a read/write recording head;
- (B) first bearing member located at an upstream location relative to said read/write recording head and second bearing member located at a downstream location relative to said read/write recording head;
- (C) a take-up mechanism including a hub having an outer surface about which the tape medium is to be wound; and
- (D) a rotatable drive operative to rotate said hub thereby to wind said tape medium thereon; and
- (E) a threading assembly including a leader block adapted to engage the leader pin when said spool is mounted on the read/write apparatus and to convey the free end of the tape medium to the take-up mechanism, said leader block including:
  - (1) a body member; and
  - (2) a latch member pivotally disposed on said body member, said latch member including a catch piece relatively movable with respect to the body member between an open position to permit engagement and disengagement with the leader pin and a closed position to retain the leader pin when the leader pin is engaged therein.

48. A read/write apparatus adapted to receive a spool of tape medium having a leader pin on a free end thereof, said read/write apparatus operative to perform a read/write function thereon as said tape medium advances in a forward direction, comprising:
- (A) a primary guide track;
- (B) a flexible conveyor member received in said primary guide track;
- (C) a read/write recording head;
- (D) first bearing member located at an upstream location relative to said read/write recording head and second bearing member located at a downstream location relative to said read/write recording head;
- (E) a take-up mechanism including a hub having an outer surface about which the tape medium is to be wound; and
- (F) a rotatable drive operative to rotate said hub thereby to wind said tape medium thereon; and
- (G) a threading assembly including a leader block adapted to engage a free end of the tape medium when said spool is mounted on the read/write apparatus and to convey the free end to the take-up mechanism, said leader block including:
  - (1) a body member supporting a mounting member adapted to secure to said flexible conveyor member and having a leading edge portion, said body member including first and second spaced-apart engagement structures disposed on said leading edge portion operative to engage the leader pin when said body member is advanced in the first direction, each said engagement structure including at least one finger projecting from said body member;
  - (2) a latch member pivotally disposed on said body member, said latch member including first and second arms each terminating in a catch piece associated with a respective one of said first and second engagement structures, said latch member relatively movable with respect to the body member between an open position to permit each said catch piece to interact with a respective finger to engage with and disengage from the leader pin and a closed position to retain the leader pin when the leader pin is engaged therein; and
  - (3) a spring piece operative to bias said latch member into the closed position with a restorative force.

49. A read/write apparatus according to claim 48 wherein said conveyor member is selected from a group consisting of chains and belts.

50. A read/write apparatus according to claim 48 including a secondary guide track formed as a mirror image of said primary guide track, said secondary guide track receiving a portion of the leader pin therein for sliding movement therein.

51. A threading assembly according to claim 48 including an actuator operative to engage said latch member movable between an active position wherein said actuator moves said latch member into the open position and an inactive position wherein the restorative force moves said catch piece into the closed position.

52. A read/write apparatus according to claim 51 including a cam operative to advance said actuator from the inactive position to the active position.

53. A read/write apparatus according to claim 52 wherein said actuator is constructed as a lever pivotally movable between the active and inactive positions over a throw distance.

54. A method of threading a tape medium from a tape source through a read/write recording apparatus wherein said tape medium has a leader pin associated therewith, comprising:
- (A) advancing a releasably latchable leader block into abutment with said leader pin and engaging said leader pin with said leader block;
- (B) latching said leader block to capture said leader pin therein;
- (C) advancing the leader block to a winding hub;
- (E) rotating said hub thereby to wind said tape medium thereon;
- (F) after a portion of the tape medium has been wound on said hub, rotating said hub to unwind said tape medium from the winding surface and rewinding the tape medium into the tape source;
- (G) returning said leader block to a location adjacent to the tape source; and
- (H) unlatching said leader pin from said leader block by pivoting a latch portion thereof out of engagement with said leader pin.

55. A method according to claim 54 wherein the step of latching said leader block to capture said leader pin is accomplished by pressing said leader block against said leader pin to snap-lock said leader pin therein.

56. A method according to claim 55 wherein the step of unlatching said leader pin from said leader block is accomplished by advancing an actuator again a portion of said leader block to pivot the latch portion thereof out of engagement with said leader pin.

* * * * *